Jan. 10, 1950 P. A. SPANOS 2,494,146
GREASE TRAPPING DEVICE
Filed June 7, 1946
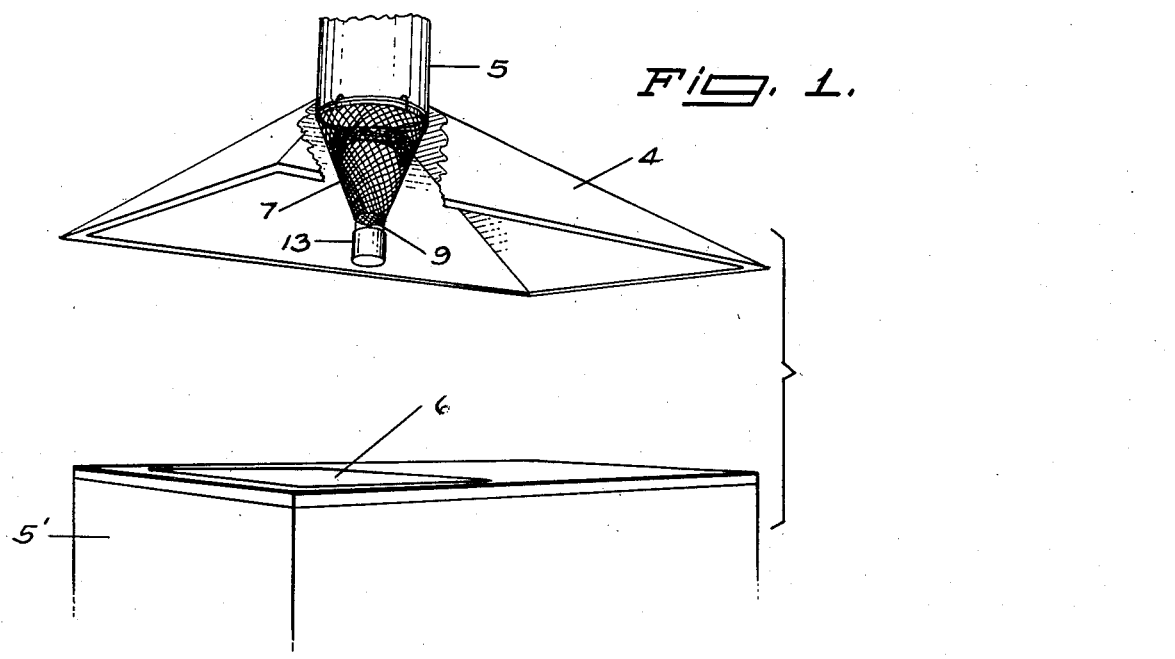
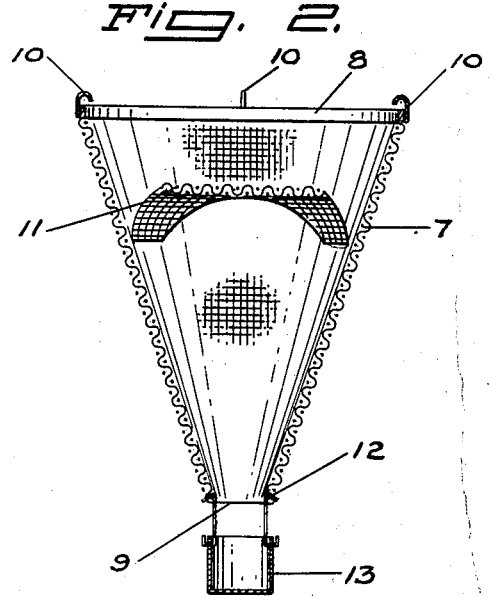
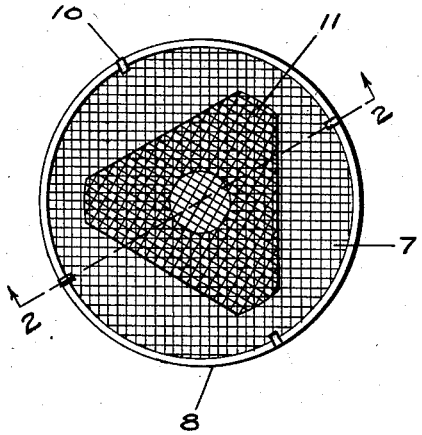
INVENTOR.
PETER A. SPANOS
BY Edward C. Healy
ATTORNEY Patented Jan. 10, 1950

2,494,146

UNITED STATES PATENT OFFICE 2,494,146

GREASE TRAPPING DEVICE

Peter A. Spanos, San Francisco, Calif.

Application June 7, 1946, Serial No. 675,133

1 Claim. (Cl. 183—72)

This invention relates to improvements in grease trapping devices and has particular reference to a grease trapper associated with the outlet vent-pipe that is connected to the metal hood or canopy positioned directly above the cooking stove of a restaurant or like eating emporium.

The principal object of the invention is to employ a device of this character so constructed that it will function to positively catch and retain the oily vapors that arise from cooking utensils such as frying pans, or griddles that serve as the frying surface in stoves.

A further object of the invention is to associate with the trap proper, a container that will catch and retain therein any grease drippings that fall from the trap.

An additional object of the invention is to provide means for detachably securing the trap to an outlet vent-pipe, whereby the device may be readily removed for cleaning purposes.

A further object of the invention is the production of a sanitary device of the character described that is simple in construction, economical to manufacture, positive in operation, strong, durable and highly efficient in use.

Other objects and advantages will be apparent during the course of the following description.

In the accompanying drawing forming a part of this specification and in which like numerals are employed to designate like parts throughout the same, Fig. 1 is a perspective view illustrating a stove and griddle with the canopy or hood positioned over the stove, and the grease trapping device in an operative position, Fig. 2 is a transverse vertical section through the trap and container, the view being taken on the line 2—2 of Fig. 3, and Fig. 3 is a top plan view of the trapping device.

It is a well-known fact that many disastrous fires have been caused in restaurants which have been started due to the presence of accumulated grease in the vent-pipe that carries cooking fumes therethrough. It is also a laborious task to dislodge the vent-pipe to clean from the same the accumulated matter that is frequently the cause of a conflagration. To therefore provide a positive means in the form of a grease trap that will gather therein the said matter and will prevent the same from entering the vent-pipe I have devised the present invention.

In the accompanying drawing wherein for the purpose of illustration is shown a preferred embodiment of my invention the numeral 4 indicates a canopy or hood as generally employed in restaurants through which extends a vent-pipe 5. It is in a vent-pipe of this character that grease accumulates, which grease is often the medium for starting a fire when the layers of grease ignite.

The numeral 5' indicates a stove equipped with a griddle plate 6 upon which, as a rule, the food products are generally fried. The article of my invention comprises an inverted cone shaped member, the body 7 of which is made of wire mesh, which member is equipped with an enlarged open end the rim portion of which is provided with an asbestos lining 8 about the inner periphery thereof, and a restricted lower open end 9, that is formed by cutting away the apex of the cone. To the asbestos covering, that serves as a seat about the outer periphery of the vent-pipe, spaced hooks 10 are secured that serve to suspend and detachably retain the trap on the vent-pipe 5. The said body comprises the main trap of the present device and functions, due to the mesh construction employed, to break the grease vapors, as they pass upwardly from the stove, into greasy matter that will readily adhere to the mesh of the trap. It is obvious that certain of the fumes will pass through the mesh construction of the upper portions of the main trap, and for this reason I have employed an auxiliary or secondary grease retaining trap portion 11, likewise made of wire mesh to thus retain the grease thereon. This auxiliary trap is of a substantially triangular form and is of a shallow configuration. It will be noted that the three corners of the trap can be detachably connected to the inner surface of the body 7 of the main trap and will assume the position disclosed to advantage in Figs. 1 and 3 of the drawing.

It is to be noted that under certain heat conditions, a limited amount of grease drippings will fall from the main trap and pass through the restricted opening. To therefore provide a depository for the liquid grease, I propose to detachably secure by a plurality of spaced hooks 12, a container 13 that directly underlies the restricted open end 9.

After the device has trapped the grease it is removed from its suspended position, the body 7, the secondary trap 11 and the container 13 are separately washed and the trap is again suspended for its grease trapping function.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention I claim:

A grease trapping device positioned below and detachably secured to an outlet vent-pipe and comprising an inverted cone-shaped member made of wire mesh, said member having an enlarged open upper end and a restricted open lower end the rim portion of said member at its enlarged open end having an asbestos lining in the inner periphery thereof, and a container suspended beneath said member adjacent its lower open end and in alignment therewith, said container suspension means comprising spaced hook elements connected to the lower end of said member and to said container, said container being capable of receiving therein grease drippings passing through the lower open end of said cone-shaped member.

PETER A. SPANOS.

REFERENCES CITED

The following references are of record in the file of this patent:

UNITED STATES PATENTS

| Number | Name | Date |
| --- | --- | --- |
| 286,643 | Schwibinger | Oct. 16, 1883 |
| 527,661 | Bultman | Oct. 16, 1894 |
| 663,148 | Conner | Dec. 4, 1900 |

FOREIGN PATENTS

| Number | Country | Date |
| --- | --- | --- |
| 237,665 | Great Britain | Aug. 6, 1925 |
| 6,911 | Sweden | June 6, 1896 |